United States Patent Office 3,084,156
Patented Apr. 2, 1963

---

3,084,156
17β - [N - (AMINOALKYL)AMINO]ANDROSTAN - 3-OLS, 5-DEHYDRO DERIVATIVES CORRESPONDING, AND ESTERS THEREOF
Raymond E. Counsell, Skokie, and Paul D. Klimstra, Northbrook, Ill., assignors to G. D. Searle & Co., Chicago, Ill., a corporation of Delaware
No Drawing. Filed Nov. 30, 1961, Ser. No. 156,136
10 Claims. (Cl. 260—239.5)

The present invention relates to novel 17-substituted aminoalkylamino steroids of the androstane series and, more particularly, to 17β-[N-(aminoalkyl)amino]androstan-3-ols, the corresponding 5-dehydro derivatives, and esters thereof, which are represented by the structural formula

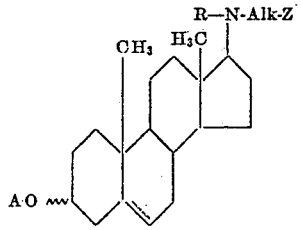

wherein A is hydrogen or a lower alkanoyl radical, R is hydrogen or a lower alkyl radical, Alk is a lower alkylene radical containing more than one carbon atom and separating the —NR and Z functions by at least 2 carbon atoms, the dotted line indicates that the linkage between carbon atoms 5 and 6 can be, alternatively, singly or doubly bonded, the wavy line indicates the alternative α or β stereochemical configuration at carbon atom 3, and Z is a radical selected from the group consisting of

and

radicals, wherein R' and R" can be hydrogen or a lower alkyl radical, X is a methylene, epoxy, or (lower alkyl)-imino radical, and n can be 0 or 1.

The lower alkyl and lower alkylene radicals encompassed in the structural representation supra are exemplified by methyl, ethyl, propyl, butyl, pentyl, hexyl, ethylene, trimethylene, tetramethylene, pentamethylene, and the branched-chain isomers thereof. Illustrative of the lower alkanoyl groups represented by A are formyl, acetyl, propionyl, butyryl, valeryl, caproyl, and the branched-chain groups isomeric therewith.

Suitable starting materials for the manufacture of the compounds of the present invention are the 3α and 3β isomers of 3-hydroxyandrost-5-en-17-one, 3-hydroxy-5α-androstan-17-one, and the lower alkanoate esters thereof. Reaction of one of the latter 17-ketones with an aminoalkylamine and formic acid at an elevated temperature results in an intermediate 17β-[N-(aminoalkyl)form-amido] derivative of the structural formula

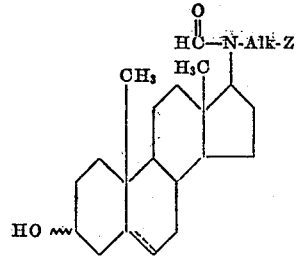

wherein Alk, Z, the dotted line, and the wavy line have the identical meanings recited supra. Reduction of these formamides in a suitable reducing medium such as lithium aluminum hydride affords the instant compounds wherein R is a methyl radical. On the other hand, hydrolysis of the intermediate formamido substances, suitably by heating with a dilute mineral acid such as hydrochloric acid, produces the compounds of this invention wherein R is hydrogen. These two-step processes are specifically illustrated by the reaction of 3β-hydroxyandrost-5-en-17-one with 3-dimethylaminopropylamine and formic acid at 170–180° to yield 17β-[N-(3-dimethylaminopropyl) formamido]androst-5-en-3β-ol, which affords 17β-[N-methyl - N - (3 - dimethylaminopropyl)amino]androst-5-en-3β-ol upon reduction with lithium aluminum hydride, and 17β - [N-(3-dimethylaminopropyl)amino]androst-5-en-3β-ol upon hydrolysis with hydrochloric acid.

An alternate route to the N-alkyl compounds of the present invention involves alkylation of the corresponding compounds possessing a secondary-amino nitrogen at carbon atom 17. For example, 17β-[N-(3-diethylamino-propyl)amino]androst-5-en-3β-ol is allowed to react with formic acid and formaldehyde, resulting in 17β-[N-methyl - N - (3-diethylaminopropyl)amino]androst-5-en-3β-ol.

An alternate process for the preparation of the instant compounds wherein R is hydrogen involves condensation of an aforementioned 17-ketone with the appropriate aminoalkylamine in the presence of an acidic catalyst to afford the corresponding imine. Typically, 3β-acetoxy-androst-5-en-17-one and 3-dimethylaminopropylamine are heated with a catalytic quantity of p-toluenesulfonic acid to yield 17-[N-(3-dimethylaminopropyl)imino]androst-5-en-3β-ol 3-acetate. Reduction of these imines by treatment with a suitable chemical reducing agent such as lithium aluminum hydride or by catalytic hydrogenation in the presence of a suitable hydrogenation catalyst such as platinum oxide produces the desired 17-amino compounds. The aforementioned 17-[N-(3-dimethylamino-propyl)imino]androst-5-en-3β-ol 3-acetate, for example, is treated with lithium aluminum hydride to produce 17β-[N-(3-dimethylaminopropyl)amino]androst-5-en-3β - ol. The catalytic hydrogenation of 17-[N-(3-dimethylaminopropyl)imino]-5α-androstan-3β-ol 3-acetate, prepared by the reaction of 3β-acetoxy-5α-androstan-17-one with 3-dimethylaminopropylamine and p-toluenesulfonic acid, in the presence of platinum oxide catalyst results in 17β - [N-(3-dimethylaminopropyl)amino]-5α-androstan-3β-ol 3-acetate.

A preferred procedure for manufacture of the instant compounds, wherein R of the structural representation supra is an alkyl radical containing more than one carbon atom, involves acylation of the corresponding instant compounds, wherein R is hydrogen, suitably with a lower alkanoic acid anhydride or acid chloride in pyridine, followed by reduction of the resulting amide, for example with lithium aluminum hydride. This process is specifically illustrated by the reaction of 17β-[N-(3-dimethylaminopropyl)amino]-5α-androstan-3β-ol with acetic anhydride in pyridine to afford the corresponding acetamido intermediate, which is reduced by means of lithium aluminum hydride, resulting in 17β-[N-ethyl-N-(3-dimethylaminopropyl)amino]-5α-androstan-3β-ol.

A preferred process for manufacture of the instant compounds wherein

represents an amino (—NH$_2$) radical involves the utilization of a compound of the structural formula

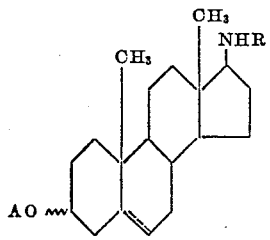

wherein R is hydrogen or a lower alkyl radical, and A, the dotted line, and the wavy line have the meanings hereinbefore indicated. These starting materials can be prepared by reaction of the corresponding 17-keto compound with the appropriate formamide in the presence of formic acid, followed by hydrolysis of the resulting formamido substance. Reaction of the latter intermediates with an α,β-olefinic nitrile affords the corresponding N-cyanoalkyl derivatives. Reduction of these amino nitriles, typically with lithium aluminum hydride, affords the instant compounds of the structural formula

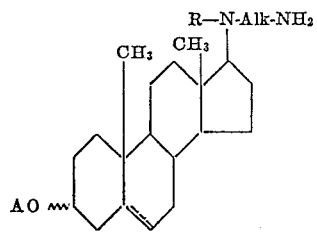

The latter processes are specifically illustrated by the following sequence of reactions. 3β-hydroxyandrost-5-en-17-one is heated at the reflux temperature with N-methylformamide and formic acid to yield a product, which is heated in methanol with hydrochloric acid to produce 17β-methylaminoandrost-5-en-3β-ol. Reaction of this substance with acrylonitrile in the presence of an alkaline catalyst such as trimethyl benzylammonium hydroxide, yields 17β-[N-methyl-N-(2-cyanoethyl)amino]androst-5-en-3β-ol. This cyano compound is reduced with lithium aluminum hydride to afford the instant 17β-[N-methyl-N-(3-aminopropyl)amino]androst-5-en-3β-ol.

A preferred process for the manufacture of the compounds of this invention, wherein Z represents a mono-alkylamino radical, involves reaction of the aforementioned compounds of the structural formula

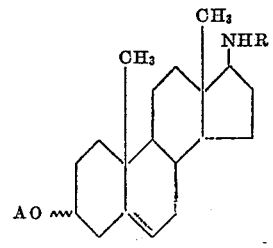

with a chloro(lower alkanoyl) chloride to produce the corresponding 17-chloroalkylamido 3-chloro-ester. Hydrolysis of the ester function followed by reaction with a suitable primary amine affords the mono-alkylaminoalkylamido compound, which is converted to the instant mono-alkylaminoalkylamino compound by reduction, suitably with lithium aluminum hydride. For example, the aforementioned 17β-methylaminoandrost-5-en-3β-ol is allowed to react with 2-chloropropionyl chloride to afford 17β-[N-methyl - N - (2-chloropropionyl)amino]androst-5-en-3β-ol 3-(2-chloropropionate). Hydrolysis with aqueous potassium hydroxide in dioxane followed by reaction with methylamine affords 17β-[N-methyl-N-(2-methylaminopropionyl)amino]androst-5-en-3β-ol, which is reduced by means of lithium aluminum hydride to yield 17β - [N - methyl - N - (3 - methylaminopropyl)amino]-androst-5-en-3β-ol.

An alternate route to the instant 5α-androstane derivatives involves catalytic hydrogenation of the corresponding androst-5-enes. A specific example of this process is the reaction of 17β-[N-methyl-N-(3-diethylaminopropyl)-amino]androst-5-en-3β-ol with hydrogen in the presence of platinum oxide catalyst to afford 17β-[N-methyl-N-(3-diethylaminopropyl)amino]-5α-androstan-3β-ol.

Equivalent to the instant amines for the purposes of this invention are the corresponding non-toxic acid and quaternary salts which are exemplified by the citrate, tartrate, maleate, ascorbate, gluconate, lactate, succinate, phosphate, sulfate, hydrobromide, hydrochloride, methiodide, ethiodide, methochloride, methobromide, methosulfate, ethosulfate, etc.

This application is a continuation-in-part of our co-pending application, Serial No. 98,745, filed March 28, 1961.

The compounds of this invention are useful as a result of their valuable pharmacological properties. They are, for example, anorectic agents, anti-arrhythmic agents in view of their ability to reverse atrial and ventricular fibrillations, and hypocholesterolemic agents. The quaternary salts are, in addition, hypotensive agents.

The invention is illustrated more fully by the examples which follow. These examples are set forth by way of illustration only and it will be understood that the invention is not to be construed as limited in spirit or in scope by the details contained therein, as many modifications in materials and methods will be apparent from this disclosure to those skilled in the art. In these examples temperatures are given in degrees centigrade (° C.). Quantities of materials are expressed in parts by weight unless otherwise noted.

*Example 1*

A mixture of 10 parts of 3β-hydroxyandrost-5-en-17-one, 20 parts of 2-diethylaminoethylamine, and 36.6 parts of formic acid is heated at 175–180° for about 8 hours, then cooled, diluted with water, and extracted with chloroform. The organic layer is separated, washed with water, dried over anhydrous sodium sulfate, and concentrated to dryness to afford a residue containing 17β-[N-(2-diethylaminoethyl)formamido]androst-5-en - 3β - ol. To this residue is added 32 parts of methanol and 12 parts of concentrated hydrochloric acid, and the resulting mixture is heated at reflux for about 15 hours, then cooled and concentrated to dryness in vacuo. The residual solid is recrystallized from aqueous isopropyl alcohol to afford 17β-[N-(2-diethylaminoethyl)amino]androst-5-en-3β-ol dihydrochloride, M.P. about 289° (dec.). It is represented by the structural formula

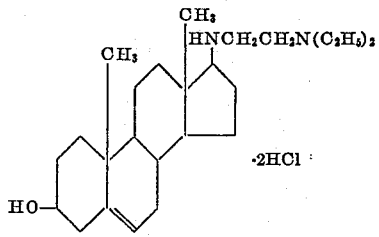

*Example 2*

A solution of 15 parts of 3β-hydroxyandrost-5-en-17-one and 30 parts of 3-dimethylaminopropylamine in 36.6 parts of formic acid is heated in an oil bath at about 170–180° for about 24 hours. The cooled mixture is diluted with about 500 parts of water, and the resulting aqueous mixture is extracted with chloroform containing a small amount of methanol. The organic layer is separated, washed with water, dried over anhydrous sodium sulfate, and evaporated to dryness under reduced pressure. The viscous residue is dissolved in a mixture of 80 parts of isopropyl alcohol and 420 parts of ether, and this solution is treated with isopropanolic hydrogen chloride. The resulting precipitate is collected by filtration and washed with acetone to afford 17β-[N-(3-dimethylaminopropyl)formamido]androst-5-en-3β-ol hydrochloride. A solution of this hydrochloride in aqueous methanol is made alkaline by the addition of dilute aqueous sodium hydroxide, and the resulting colloidal precipitate is extracted with chloroform. The chloroform extract is washed with water, dried over anhydrous sodium sulfate and concentrated to dryness to afford a residue, which is crystallized from acetone, resulting in 17β-[N-(3-dimethylaminopropyl)formamido]androst-5-en-3β-ol, which displays a double melting point at about 116–118° and 143–148°; $[\alpha]_D = -67.5°$ (chloroform).

*Example 3*

A solution of 33 parts of 3β-acetoxyandrost-5-en-17-one and 20.4 parts of 3-dimethylaminopropylamine in 350 parts of benzene is heated at reflux until the separation of water ceases; then 3.6 parts of p-toluenesulfonic acid is added, and refluxing together with water separation is continued for about 2 hours. This reaction mixture is cooled, washed with water, dried over anhydrous potassium carbonate, and evaporated to dryness under reduced pressure. Recrystallization of the residue from hexane affords pure 17-[N-(3-dimethylaminopropyl)imino]androst-5-en-3β-ol 3-acetate, M.P. about 86.5–88.5°; $[\alpha]_D = -37°$ (chloroform).

*Example 4*

To a slurry of 4 parts of lithium aluminum hydride in 150 parts of dioxane is added dropwise with stirring, at the reflux temperature, a solution of 10 parts of 17β-[N-(3 - dimethylaminopropyl)formamido]androst-5-en-3β-ol in 150 parts of dioxane. This reaction mixture is heated at reflux for about 18 hours longer, then treated dropwise successively, at the reflux temperature, with a solution of 4 parts of water in 25 parts of dioxane, 3 parts of 20% aqueous sodium hydroxide, and 14 parts of water. The resulting mixture is clarified by filtration, and the residue on the filter is washed with fresh dioxane. The filtrates are combined, evaporated to dryness under reduced pressure, and the resulting residue is recrystallized from acetone-methanol to produce 17β-[N-methyl-N-(3-dimethylaminopropyl)amino]androst-5-en-3β-ol, M.P. about 146–148°; $[\alpha]_D = -54.5°$ (chloroform). A solution of this amine in ether-isopropyl alcohol is treated with isopropanolic hydrogen chloride to afford the corresponding dihydrochloride; $[\alpha]_D = -32°$ (methanol). It is represented by the structural formula

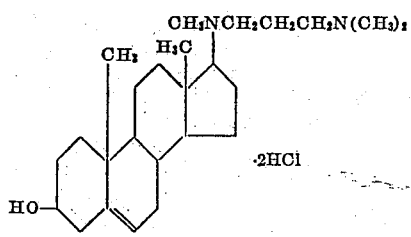

*Example 5*

To a refluxing slurry of 15 parts of lithium aluminum hydride in 250 parts of dioxane is added dropwise a solution of 31 parts of 17-[N-(3-dimethylaminopropyl)imino]androst-5-en-3β-ol 3-acetate in 250 parts of dioxane. Refluxing and stirring are continued for about 4 hours, after which time the mixture is treated successively with 15 parts of water, 11.25 parts of 20% aqueous sodium hydroxide, and 52.5 parts of water. The insoluble salts are removed by filtration and washed with dioxane, and the filtrate is concentrated to dryness in vacuo. Recrystallization first from aqueous ethanol, then from methanol-acetone affords needle-like crystals of 17β-[N-(3-dimethylaminopropyl)amino]androst - 5 - en-3β-ol, M.P. about 160–162°; $[\alpha]_D = -39.5°$ (chloroform). Treatment of a solution of this free base in ether-isopropyl alcohol with isopropanolic hydrogen chloride, and recrystallization of the resulting precipitate from aqueous isopropyl alcohol affords the corresponding dihydrochloride; $[\alpha]_D = -23.5°$ (methanol). This compound can be represented by the structural formula

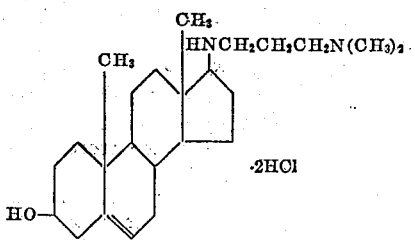

*Example 6*

A solution of 30 parts of 3β-hydroxy-5α-androstan-17-one and 60 parts of 3-dimethylaminopropyl-amine in 73.2 parts of formic acid is heated at 170–180° for about 24 hours, then cooled and poured cautiously into 700 parts of dilute sodium hydroxide. The resulting aqueous mixture is extracted with ether containing isopropyl alcohol, and the organic layer is separated, and treated with isopropanolic hydrogen chloride. The resulting precipitate is collected by filtration and washed with ether to yield the crude hydrochloride. Recrystallization from aqueous isopropyl alcohol affords pure 17β-[N-(3-dimethylaminopropyl)formamido] - 5α - androstan - 3β - ol hydrochloride; $[\alpha]_D = +3°$ (methanol). A solution of this hydrochloride in aqueous methanol is treated with 20% aqueous sodium hydroxide, and the resulting mixture is poured slowly into cold water. The precipitate which forms is collected by filtration and recrystallized from acetone to yield 17β-[N-(3-dimethylaminopropyl)-formamido]-5α-androstan-3β-ol, M.P. about 148–150°; $[\alpha]_D = -5.5°$ (chloroform).

*Example 7*

A solution of 5 parts of 17β-[N-(3-dimethylaminopropyl)formamido]-5α-androstan-3β-ol hydrochloride in 80 parts of ethanol and 5 parts of concentrated hydrochloric acid is heated at reflux for about 6 hours. The solvent is removed by distillation in vacuo and the resulting residue is crystallized from aqueous isopropyl alcohol to afford 17β-[N-(3-dimethylaminopropyl)amino]-5α-androstan-3β-ol dihydrochloride; [α]_D=+20.5° (methanol).

The latter aqueous isopropyl alcohol mother liquor is concentrated to dryness in vacuo, and the resulting residue is dissolved in aqueous methanol, then made alkaline with 20% aqueous sodium hydroxide. The resulting precipitate is extracted with chloroform, and the organic layer is dried over anhydrous sodium sulfate then concentrated in vacuo to afford a straw-colored oil. Crystallization of this oil from acetone-methanol results in pure 17β - [N - (3 - dimethylaminopropyl)amino] - 5α - androstan-3β-ol, M.P. about 149.5–152°, of the structural formula

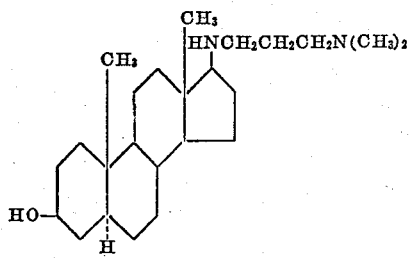

Example 8

The substitution of an equivalent quantity of 3-pyrrolidinopropylamine in the process of Example 2 results in 17β-[N-(3-pyrrolidinopropyl)formamido]androst-5-en-3β-ol, M.P. about 135–138°.

Example 9

The substitution of an equivalent quantity of 3-pyrrolidinopropylamine in the process of Example 3 results in 17 - [N - (3 - pyrrolidinopropyl)imino]androst - 5-en-3β-ol 3-acetate, M.P. about 100–101°; [α]_D=—36° (chloroform).

Example 10

The reduction of 20 parts of 17-[N-(3-pyrrolidinopropyl)imino]androst-5-en-3β-ol 3-acetate with 10 parts of lithium aluminum hydride by the procedure described in Example 5 results in 17β-[N-(3-pyrrolidinopropyl)-amino]-androst-5-en-3β-ol. Recrystallization from acetone-methanol affords a pure sample, M.P. about 164.5–166.5°; [α]_D=—35° (chloroform).

A solution of the latter free base in anhydrous ether containing a small quantity of isopropyl alcohol is treated with isopropanolic hydrogen chloride. The resulting precipitate is collected by filtration and recrystallized from aqueous isopropyl alcohol to yield the corresponding dihydrochloride; [α]_D=—19° (methanol).

Example 11

The substitution of an equivalent quantity of 3-morpholinopropylamine in the process of Example 1 affords 17β - [N - (3 - morpholinopropyl)formamido]androst-5-en-3β-ol hydrochloride. This crude hydrochloride is recrystallized from aqueous isopropyl alcohol to afford a pure sample; [α]_D=—45° (methanol).

A solution of the crude hydrochloride in aqueous methanol is treated with dilute aqueous sodium hydroxide, and the resulting mixture is extracted with chloroform. The organic layer is separated, washed with water, dried over anhydrous sodium sulfate, and concentrated to dryness under reduced pressure to afford 17β-[N-(3-morpholinopropyl)formamido]-androst-5-en-3β-ol, M.P. about 128–131°; [α]_D=—61.5° (chloroform).

Example 12

A mixture of 16.5 parts of 3β-acetoxyandrost-5-en-17-one, 9 parts of 3-morpholinopropylamine, 0.9 part of p-toluenesulfonic acid monohydrate, 20 parts of pyridine and 87 parts of toluene is distilled slowly for about 6 hours, during which time approximately 100 parts by volume of distillate is collected. The reaction mixture is cooled, washed with water, dried over anhydrous sodium sulfate, and evaporated to dryness in vacuo to afford crystalline 17-[N-(3-morpholinopropyl)imino]androst-5-en-3β-ol 3-acetate. Recrystallization from hexane affords a pure sample, M.P. about 115–118°; [α]_D=—35.5° (chloroform).

Example 13

A solution of 33.25 parts of 3β-acetoxy-5α-androstan-17-one, 12.25 parts of 3-dimethylaminopropylamine and 1.8 parts of p-toluenesulfonic acid monohydrate in 200 parts of benzene is heated at reflux, during which time the water of reaction is removed by means of a Dean-Stark water trap. The cooled reaction mixture is washed with water, dried over anhydrous potassium carbonate, and concentrated to dryness to afford a viscous oil consisting of 17-[N-(3-dimethylaminopropyl)imino]-5α-androstan-3β-ol 3-acetate. A solution of this free base in ether is treated with isopropanolic hydrogen chloride to yield the corresponding dihydrochloride; [α]_D=+44.5° (methanol).

Example 14

A solution of 17-[N-(3-dimethylaminopropyl)-imino]-5α-androstan-3β-ol 3-acetate in 200 parts of dioxane is hydrogenated in the presence of 3 parts of platinum oxide catalyst at room temperature and about 4 atmospheres pressure until the uptake of hydrogen ceases. The catalyst is removed by filtration and washed with dioxane. Removal of the solvent from the filtrate affords a yellow oil, which is crystallized from pentane to produce needle-like crystals of 17β-[N-(3-dimethylaminopropyl)amino]-5α-androstan-3β-ol 3-acetate. A solution of this free base in anhydrous ether is acidified with isopropanolic hydrogen chloride and the resulting precipitate is collected by filtration and washed with anhydrous ether. Recrystallization from aqueous isopropanol affords the corresponding dihydrochloride; [α]_D=+19° (methanol). It is represented by the structural formula

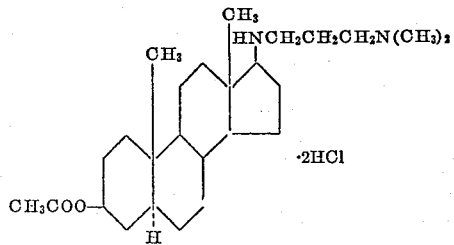

Example 15

A mixture of 15 parts of 3β-acetoxyandrost-5-en-17-one, 8 parts of 2-dimethylaminoethylamine, 1.7 parts of p-toluenesulfonic acid monohydrate, and 160 parts of benzene is heated at reflux for about 4 hours, during which time the water formed is separated by means of a Dean-Stark water trap. The mixture is cooled and allowed to stand at room temperature for about 15 hours, then filtered to remove the precipitated p-toluenesulfonic acid salt of 2-dimethylaminoethylamine. The solvent is removed by distillation in vacuo, and the residual solid is dissolved in ether, then treated with isopropanolic hydrogen chloride. The resulting hydrochloride is collected by filtration, washed with ether, and recrystallized from aqueous ethanol to afford pure 17-[N-(2-dimethylaminoethyl)imino]androst-5-en-3β-ol 3-acetate dihydrochloride.

A solution of this dihydrochloride in water is made alkaline by the addition of dilute aqueous sodium carbonate. This alkaline mixture is extracted with chloroform, and the organic layer is washed with water, dried over anhydrous potassium carbonate containing decolorizing carbon and concentrated to dryness in vacuo. The oily residue is recrystallized from hexane to produce 17-[N-(2-dimethylaminoethyl)imino]-androst - 5 - en-3β-ol 3-acetate.

Example 16

To a solution of 3.3 parts of lithium aluminum hydride in 100 parts of dioxane, under nitrogen, is added, dropwise with stirring at the reflux temperature, a solution of 8 parts of 17-[N-(2-dimethylaminoethyl)imino]androst-5-en-3β-ol 3-acetate in 130 parts of dioxane over a period of about 2½ hours. The reaction mixture is heated at reflux for about 2¾ hours longer, then allowed to stand at room temperature for about 15 hours. The excess reducing agent is decomposed by the successive addition of 4 parts of water in 25 parts of dioxane, 2.5 parts of 20% aqueous sodium hydroxide, and 12 parts of water. The inorganic salts are removed by filtration and washed with dioxane. Concentration of the filtrate to dryness affords a solid residue, which is recrystallized from acetone to produce 17β-[N-(2-dimethylaminoethyl)amino]androst-5-en-3β-ol, M.P. about 135–136°. This compound is represented by the structural formula

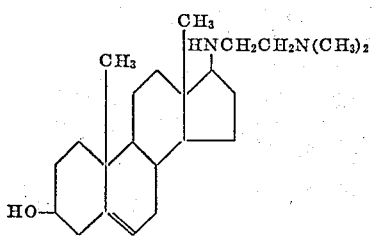

Example 17

A mixture of one part of 17β-[N-(2-dimethylaminoethyl)amino]androst-5-en-3β-ol, 0.25 part of platinum oxide catalyst, and 26 parts of glacial acetic acid is stirred in a hydrogen atmosphere at room temperature and atmospheric pressure for about 2½ hours. The catalyst is removed by filtration, and the filtrate is concentrated to afford an oil. To this oil is added successively 1.5 parts of sodium hydroxide in 10 parts of water and 40 parts of methanol, and the resulting mixture is heated at reflux for about 10 minutes, then cooled and poured into water and ice. The resulting aqueous mixture is extracted with chloroform, and the organic layer is washed with water, dried over anhydrous potassium carbonate containing decolorizing carbon and evaporated to an oil in vacuo. Crystallization from acetone produces 17β-[N-(2-dimethylaminoethyl)amino] - 5α - androstan-3β-ol, M.P. about 119–122°. It is represented by the structural formula

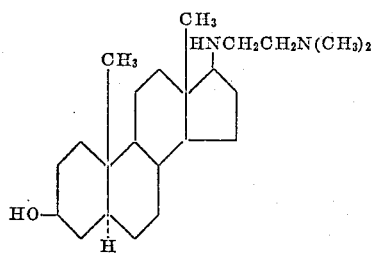

Example 18

A mixture of 25 parts of 3β-acetoxyandrost-5-en-17-one, 20 parts of 3-diethylaminopropylamine, 2.8 parts of p-toluenesulfonic acid monohydrate and 280 parts of benzene is heated at reflux for about 4½ hours with concomitant azeotropic removal of water. The reaction mixture is then cooled, washed with water, dried over anhydrous sodium sulfate containing decolorizing carbon and evaporated to dryness in vacuo. The resulting oily residue is crystallized from hexane to afford 17-[N-(3-diethylaminopropyl)imino]androst - 5 - en-3β-ol 3-acetate, M.P. about 51–52.5°.

Example 19

To a solution of 12.8 parts of lithium aluminum hydride in 300 parts of dioxane, under nitrogen, is added with stirring over a period of about one hour, a solution of 31 parts of 17-[N-(3-diethylaminopropyl)amino]androst-5-en-3β-ol 3-acetate in 350 parts of dioxane. This reaction mixture is heated at reflux for about 4½ hours then stored at room temperature for about 15 hours. Successive addition of 12.8 parts of water in 50 parts of dioxane, 9.6 parts of 20% aqueous sodium hydroxide, and 43.5 parts of water results in decomposition of the excess reducing agent. The precipitated inorganic salts are separated by filtration and washed with fresh dioxane. Concentration of the filtrate in vacuo results in an oil which is crystallized from acetone to produce 17β-[N-(3-diethylaminopropyl) - amino]androst - 5 - en - 3β-ol, M.P. about 98–100°. A solution of this free base in anhydrous ether is treated with isopropanolic hydrogen chloride to afford the corresponding dihydrochloride, which is represented by the structural formula

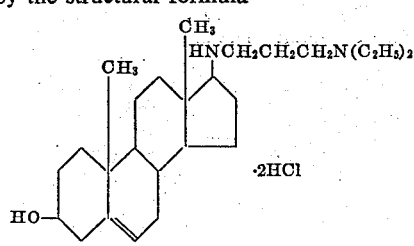

Example 20

To a solution of 8.945 parts of 17β-[N-(3-diethylaminopropyl)amino]androst-5-en-3β-ol in 250 parts of glacial acetic acid is added 6 parts of platinum oxide catalyst, and the resulting mixture is hydrogenated at atmospheric pressure and room temperature for about 61 hours. Filtration removes the catalyst and affords a filtrate, which is concentrated in vacuo to an oil. To this oil is added 140 parts of methanol together with a solution of 6 parts of sodium hydroxide in 25 parts of water, and the resulting solution is heated at reflux for about 20 minutes, then cooled and poured into dilute aqueous sodium hydroxide. The resulting solid is collected by filtration and extracted with chloroform. The organic layer is washed with water, dried over anhydrous potassium carbonate containing decolorizing carbon, and concentrated in vacuo to yield an oil. A solution of this oil in acetone-ether is treated with isopropanolic hydrogen chloride, and the resulting salt is collected by filtration and washed with ether, then recrystallized from aqueous ethanol to produce 17β-[N-(3-diethylaminopropyl)amino]-5α-androstan-3β-ol dihydrochloride.

Crystallization from acetone of the oil obtained from the chloroform extract described in the previous paragraph, produces 17β - [N-(3-diethylaminopropyl)amino]-5α-androstan-3β-ol, M.P. about 72–73°. This substance is represented by the structural formula

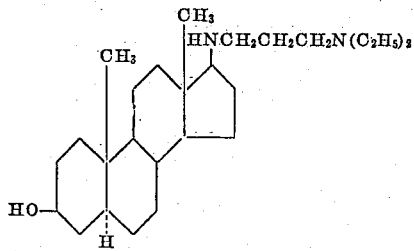

Example 21

To a solution of 30 parts of 3β-hydroxyandrost-5-en-17-one in 19.5 parts of formic acid is added dropwise 60 parts of 3-diethylaminopropylamine, and the resulting mixture is heated with stirring in an oil bath at 175–180° for about 24 hours, then cooled and poured into dilute aqueous sodium hydroxide. The precipitate which forms is collected by decantation and extracted with chloroform. The organic layer is washed with water, dried over anhydrous potassium carbonate containing decolorizing carbon and concentrated in vacuo to afford an oily residue containing 17β - [N-(3-diethylaminopropyl)formamido]-androst-5-en-3β-ol. A solution of this oil in acetone-ether is treated with isopropanolic hydrogen chloride with stirring. The resulting precipitated salt is collected by filtration, washed successively with acetone-ether and with ether, then dried to yield the corresponding hydrochloride.

*Example 22*

To a solution of 14 parts of lithium aluminum hydride in 250 parts of dioxane, under nitrogen, is added with stirring over a period of about 1½ hours, 27 parts of 17β-[N - (3-diethylaminopropyl)formamido]androst-5-en-3β-ol in 250 parts of dioxane, and the resulting mixture is heated at reflux for about 18 hours, then treated successively with a solution of 14 parts of water in 15 parts of dioxane, 10 parts of 20% aqueous sodium hydroxide, and 15 parts of water. The precipitated salts are removed by filtration, washed with dioxane, and discarded. The solvent is removed from the filtrate by evaporation at reduced pressure, and the resulting residual solid is recrystallized from acetone to produce 17β-[N-methyl-N-(3-diethylaminopropyl)amino]androst-5-en-3β-ol, M.P. about 89–91°. A solution of the latter amine in anhydrous ether is treated with isopropanolic hydrogen chloride to yield the corresponding dihydrochloride salt, which is represented by the structural formula

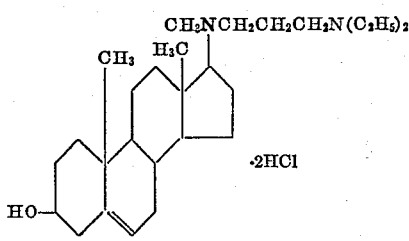

*Example 23*

A mixture of 2 parts of 17β-[N-(3-diethylaminopropyl)amino]androst-5-en-3β-ol, 1.34 parts of formic acid, and 1.08 parts of 36–38% aqueous formaldehyde is heated at 95–100° for about 4 hours, then heated at reflux for about 3 hours. The reaction mixture is cooled, poured into 24 parts of methanol, then made alkaline by the addition of concentrated aqueous sodium hydroxide. This alkaline mixture is heated at reflux for about 5 minutes, then poured into ice and water. The resulting aqueous mixture is extracted with chloroform, and the organic layer is separated, washed successively with water and dilute aqueous sodium hydroxide, then dried over anhydrous potassium carbonate containing decolorizing carbon. Removal of the solvent by distillation in vacuo affords an oily residue which solidifies upon standing. Recrystallization of this solid from acetone results in pure 17β-[N-methyl-N-(3-diethylaminopropyl)amino]androst-5-en-3β-ol, identical with the product of Example 22.

*Example 24*

A mixture of 8.91 parts of 17β-[N-methyl-N-(3-diethylaminopropyl)amino]androst - 5 - en-3β-ol, 1.0 part of platinum oxide catalyst and 160 parts of ethanol is hydrogenated for about 24 hours at room temperature and about 3 atmospheres pressure. Removal of the catalyst by filtration and concentration of the resulting filtrate in vacuo affords the desired product, obtained as the hydrochloride salt. Recrystallization of this crude material from aqueous ethanol affords a pure sample of 17β-[N-methyl - N-(3-diethylaminopropyl)amino]-5α-androstan-3β-ol dihydrochloride.

The crude hydrochloride is dissolved in hot water, then treated with dilute aqueous sodium carbonate. The resulting precipitate is collected by decantation, and extracted with chloroform. The chloroform extract is dried over anhydrous potassium carbonate containing decolorizing carbon, and concentrated in vacuo to yield the free base, 17β - [N - methyl - N-(3-diethylaminopropyl)amino]-5α-androstan-3β-ol, M.P. about 80–83°. It is represented by the structural formula

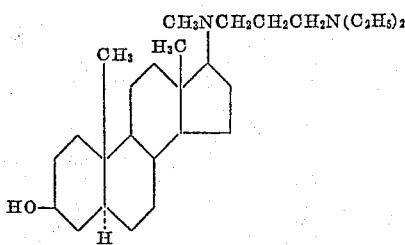

*Example 25*

A mixture consisting of 25 parts of 3β-acetoxy-androst-5-en-17-one, 20 parts of 3-piperidinopropylamine, 2.8 parts of p-toluenesulfonic acid monohydrate, and 280 parts of benzene is heated at reflux for about 4 hours, during which time the water of reaction is removed. The reaction mixture is cooled, clarified by filtration, then washed with water and dried over anhydrous sodium sulfate containing decolorizing carbon. The solvent is removed by distillation in vacuo, and the resulting residual oil is crystallized from hexane to afford 17-[N-(3-piperidinopropyl)imino]androst - 5 - en-3β-ol 3-acetate, M.P. about 80–82°.

*Example 26*

To a solution of 12.8 parts of lithium aluminum hydride in 300 parts of dioxane, under nitrogen, is added dropwise with stirring over a period of about one hour, a solution of 31 parts of 17-[N-(3-piperidinopropyl)imino]androst - 5-en-3β-ol 3-acetate in 350 parts of dioxane. This reaction mixture is heated at reflux for about 4½ hours, stored at room temperature for about 15 hours, then treated successively with a solution of 12.8 parts of water in 50 parts of dioxane, 10 parts of 20% aqueous sodium hydroxide, and 43 parts of water. The precipitated solids are removed by filtration and washed with dioxane. The filtrate is concentrated in vacuo to afford an oil which solidifies on standing. Recrystallization of this solid from acetone produces 17β-[N-(3-piperidinopropyl)amino]androst-5-en-3β-ol, M.P. about 141–142°. A second recrystallization from acetone provides a sample melting at about 142–142.5°.

Treatment of an ethereal solution of the latter free base with isopropanolic hydrogen chloride results in the corresponding dihydrochloride, which can be represented by the structural formula

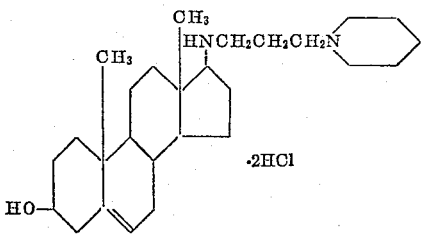

*Example 27*

To a solution of 8.5 parts of 17β-[N-(3-piperidinopropyl)amino]androst-5-en-3β-ol dihydrochloride in 200 parts of aqueous ethanol is added 8 parts of platinum oxide catalyst, and this reaction mixture is stirred in a hydrogen atmosphere for about 16 hours at room temperature and about 4 atmospheres' pressure. The catalyst is removed by filtration, and the filtrate is made alkaline by the addition of aqueous sodium carbonate. This alkaline mixture is extracted with chloroform, and the organic layer is separated, dried over anhydrous potassium carbonate containing decolorizing carbon, and evaporated under reduced pressure to afford an oil, which solidifies on standing. Recrystallization from acetone produces pure 17β-[N-(3-piperidinopropyl)amino]-5α-androstan-2β-ol, M.P. about 111–112°. Treatment of an ethereal solution of this amine with isopropanolic hydrogen chloride followed by recrystallization of the resulting precipitate from aqueous ethanol affords the corresponding dihydrochloride, which is represented by the structural formula

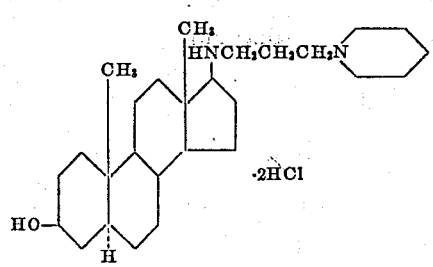

*Example 28*

To a solution of 30 parts of 3β-hydroxy-androst-5-en-17-one in 73.2 parts of formic acid is added, with stirring and cooling, 60 parts of 3-piperidinopropylamine. The reaction mixture is heated for about 24 hours in an oil bath at a temperature of 170–180°, then cooled and poured into dilute aqueous sodium hydroxide. The doughy precipitate which forms is collected by decantation and extracted with chloroform. The chloroform layer is separated, washed with water, dried over anhydrous potassium carbonate containing decolorizing carbon, then stripped of solvent at reduced pressure. The oily residue is crystallized from acetone to produce 17β-[N-(3-piperidinopropyl)formamido]androst-5-en-3β-ol. A second crystallization from acetone provides a pure sample, melting at about 131–133°.

*Example 29*

To a solution of 6.5 parts of lithium aluminum hydride in 100 parts of dioxane, under nitrogen, is added dropwise with stirring over a period of about 1½ hours, a solution of 13 parts of 17β-[N-3-piperidinopropyl)-formamido]androst-5-en-3β-ol in 200 parts of dioxane. This reaction mixture is heated at reflux with stirring for about 18 hours, then treated successively with 7 parts of water in 100 parts of dioxane, 6 parts of 20% aqueous sodium hydroxide and 24 parts of water. The precipitated inorganic salts are removed by filtration and washed on the filter with dioxane. Concentration of the resulting filtrate in vacuo affords a solid residue, which is recrystallized from acetone to yield 17β-[N-methyl-N-(3-piperidinopropyl)amino]androst-5-en-3β-ol, M.P. about 136–136.5°. This amine can be converted to the corresponding dihydrochloride salt by treatment of an ethereal solution with isopropanolic hydrogen chloride and recrystallization of the resulting solid from aqueous ethanol. This dihydrochloride is represented by the structural formula

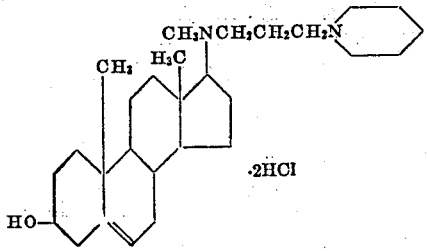

*Example 30*

A mixture of 3.85 parts of 17β-[N-methyl-N-(3-piperidinopropyl)amino]androst-5-en-3β-ol, 0.7 part of platinum oxide catalyst, and 160 parts of ethanol is hydrogenated at room temperature and about 3 atmospheres pressure for about 18 hours. Removal of the catalyst by filtration and the solvent by distillation in vacuo affords a solid residue, which is dissolved in hot water. This aqueous mixture is made alkaline by the addition of dilute aqueous sodium carbonate. The resulting precipitate is separated by decantation and extracted with chloroform. The organic layer is separated, washed with water, dried over anhydrous potassium carbonate containing decolorizing carbon, and concentrated to an oil by distillation of the solvent in vacuo. This oil is crystallized from acetone to produce 17β-[N-methyl-N-(3-piperidinopropyl)amino]-5α-androstan-3β-ol, M.P. about 134°. This amine is dissolved in ether and treated with isopropanolic hydrogen chloride to yield a precipitate, which is recrystallized from aqueous ethanol, resulting in the corresponding dihydrochloride, of the structural formula

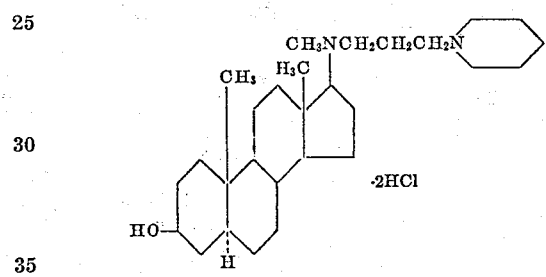

*Example 31*

To a solution of 25 parts of 3β-acetoxyandrost-5-en-17-one and 24 parts of 3-(N-methylpiperazino)-propylamine in 200 parts of benzene is added 2.8 parts of p-toluenesulfonic acid monohydrate, and the resulting mixture is heated at reflux for about 4½ hours with concomitant removal of water, then cooled and filtered to remove the precipitated solid. The resulting filtrate is washed with water, dried over anhydrous sodium sulfate containing decolorizing carbon, then stripped of solvent at reduced pressure. The resulting oil is crystallized from hexane to produce 17-{N-[3-(N'-methylpiperazino)-propyl]imino}androst-5-en-3β-ol 3-acetate, M.P. about 98–100°.

*Example 32*

To a solution of 12.8 parts of lithium aluminum hydride in 300 parts of dioxane is added dropwise with stirring over a period of about one hour, a solution of 31 parts of 17-{N-[3-(N'-methylpiperazino)propyl]-imino}-androst-5-en-3β-ol 3-acetate in 350 parts of dioxane. This reaction mixture is heated at reflux for about 4 hours then stored at room temperature for about 16 hours. Successive addition of a solution of 12.8 parts of water in 15 parts of dioxane, 10 parts of 20% aqueous sodium hydroxide, and 43 parts of water results in precipitation of inorganic salts, which are separated by filtration and washed with dioxane. The filtrate is stripped of solvent at reduced pressure to afford a solid, which is recrystallized from acetone, resulting in 17β-{N-[3-(N' - methylpiperazino)propyl]amino)androst-5-en-3β-ol, M.P. about 160–161°. Further recrystallization from acetone yields a pure sample melting at about 163–163.5°. Treatment of an ethereal solution of this free base with isopropanolic hydrogen chloride and recrystallization of the resulting precipitate from aqueous ethanol produces the corresponding trihydrochloride of the structural formula

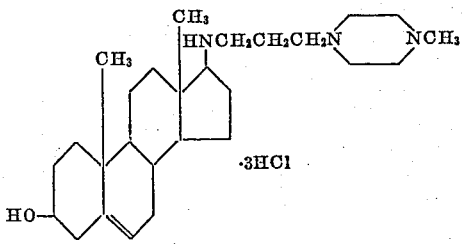

Example 33

To a solution of 8.5 parts of 17β-{N-[3-(N'-methylpiperazino)propyl]amino}androst - 5 - en-3β-ol trihydrochloride in a mixture of 100 parts of water and 80 parts of ethanol is added 8 parts of platinum oxide catalyst. This reaction mixture is stirred under hydrogen for about 8 hours at room temperature and about 4 atmospheres' pressure. The catalyst is removed by filtration, and the organic solvent is stripped by heating under reduced pressure. The resulting aqueous suspension is filtered to produce a solid, which is recrystallized from aqueous ethanol, resulting in 17β-{N-[3-(N'-methylpiperazino)propyl]amino}-5α-androstan-3β-ol trihydrochloride.

A solution of the latter crude trihydrochloride in water is treated with dilute aqueous sodium carbonate to afford the free base. This aqueous mixture is extracted with chloroform, and the organic layer is separated, washed with water, dried over potassium carbonate containing decolorizing carbon and concentrated to dryness in vacuo. Recrystallization of this white solid from acetone produces pure 17β{N-[3-(N'-methylpiperazino)propyl]amino}-5α-androstan-3β-ol, M.P. about 146–147°. It is represented by the structural formula

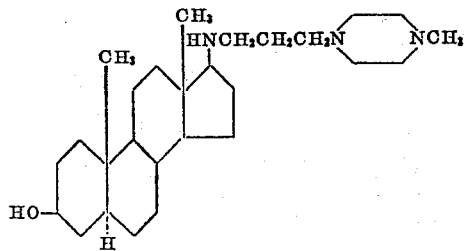

Example 34

To a solution of 20 parts of 3β-hydroxyandrost-5-en-17-one in 61 parts of formic acid is added, with stirring and cooling 40 parts of 3-(N-methylpiperazino)-propylamine. This reaction mixture is heated at a temperature of about 175–180° for about 24 hours, then poured into dilute aqueous sodium hydroxide. The resulting aqueous mixture is extracted with chloroform, and the chloroform extract is washed with water, dried over anhydrous potassium carbonate containing decolorizing carbon, and concentrated to an oil by distillation in vacuo. Crystallization of this oil from acetone produces 17β-{N-[3-(N'-methylpiperazino)propyl]formamido}androst - 5 - en-3β-ol, M.P. about 174–177°.

Example 35

To a solution of 7.5 parts of lithium aluminum hydride in 150 parts of dioxane, under nitrogen, is added dropwise with stirring over a period of about one hour, a solution of 14 parts of 17β - {N-[3-(N'-methylpiperazino)propyl]formamido}androst-5-en-3β-ol in 250 parts of dioxane. The solution is heated at reflux for about 18 hours, then cooled, and treated successively with 7 parts of water in 50 parts of dioxane, 6.2 parts of 20% aqueous sodium hydroxide, and 32 parts of water. The precipitated salts are removed by filtration and washed with warm dioxane. The resulting filtrate is concentrated in vacuo to produce a solid. A solution of this solid in acetone-ether is treated with isopropanolic hydrogen chloride to afford the crude hydrochloride salt. Recrystallization of this crude salt from aqueous ethanol produces 17β - {N - methyl-N-[3-(N' - methylpiperazino)propyl]amino}-androst-5-en-3β-ol trihydrochloride.

A solution of the latter trihydrochloride in hot water is made alkaline with dilute aqueous sodium carbonate, and the alkaline mixture is extracted with chloroform. The organic layer is separated, washed with water, dried over anhydrous potassium carbonate containing decolorizing carbon, and concentrated to an oil in vacuo. This oil solidifies upon standing, then is recrystallized from acetone to afford pure 17β-{N-methyl-N-[N'-methylpiperazino)propyl]amino}-androst - 5 - en-3β-ol, M.P. about 148–149°. It is represented by the structural formula

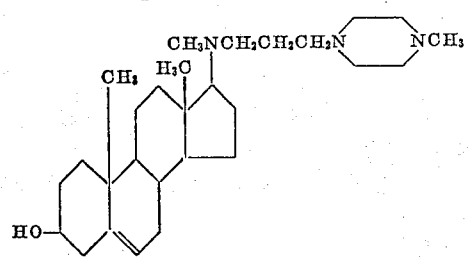

Example 36

A mixture of 4.0 parts of 17β-{N-methyl-N-[3-(N'-methylpiperazino)propyl]amino}androst - 5 - en - 3β-ol trihydrochloride, 1.0 part of platinum oxide catalyst, 40 parts of water, and 160 parts of ethanol is hydrogenated at room temperature and atmospheric pressure for about 16 hours. The catalyst is removed by filtration and the solvent by distillation in vacuo to afford a solid residue, which is dissolved in about 300 parts of hot water. Dilute aqueous sodium carbonate is added to make the solution alkaline, and the resulting mixture is extracted with chloroform. The chloroform layer is separated, washed with water, dried over anhydrous potassium carbonate containing decolorizing carbon, and concentrated to an oil in vacuo. Upon standing this oil affords a solid, which is recrystallized from acetone, resulting in 17β-{N-methyl-N-[3-(N' - methylpiperazino)propyl]amino}-5α-androstan-3β-ol, M.P. about 126–128°.

The corresponding trihydrochloride is prepared by treatment of an ethereal solution of the free base with isopropanolic hydrogen chloride and recrystallization of the resulting solid from aqueous ethanol. This trihydrochloride can be represented by the structural formula

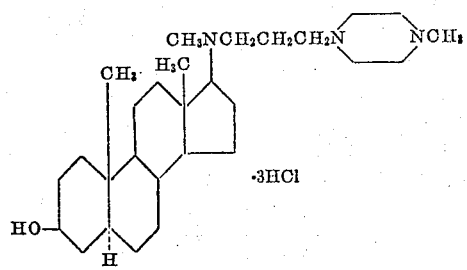

Example 37

To a solution of 20 parts of 3β-hydroxyandrost-5-en-17-one in 48.8 parts of formic acid is added, with stirring and cooling, 40 parts of 2-dimethylaminoethylamine. The resulting mixture is heated at 170–180° for about 24 hours, then poured into 120 parts of methanol. Dilution of this mixture with 1500 parts of water containing 40 parts of sodium hydroxide results in precipitation of a sticky solid, which is collected by filtration and extracted with chloroform. The organic layer is separated, washed with water, dried over anhydrous potassium carbonate containing decolorizing carbon and evaporated in vacuo to afford an oily residue. A solution of this oil in acetone-ether is treated with isopropanolic hydrogen chloride, and the resulting precipitated salt is collected by filtration washed with ether and dried to produce 17β-[N-(2-dimethylaminoethyl)formamido]androst-5-en-3β-ol hydrochloride. The pure hydrochloride is obtained by recrystallization from aqueous ethanol.

A solution of the latter hydrochloride in hot water is made alkaline by the addition of dilute aqueous sodium hydroxide. The liberated free base is extracted into chloroform, and the chloroform extract is washed with water, dried over potassium carbonate containing decolorizing carbon, and stripped of solvent under reduced pressure to yield an oil, which upon recrystallization from acetone, affords pure 17β-[N-(2-dimethylaminoethyl)formamido]androst-5-en-3β-ol, M.P. about 158–159°.

Example 38

To a solution of 4.5 parts of lithium aluminum hydride in 100 parts of dioxane, under nitrogen, is added dropwise with stirring over a period of about 15 minutes, a solution of 9 parts of 17β-[N-(2-dimethylaminoethyl)formamido]androst-5-en-3β-ol in 60 parts of dioxane. The reaction mixture is heated at reflux for about 18 hours, allowed to stand at room temperature for about 16 hours, then treated successively with 4.5 parts of water in 15 parts of dioxane, 3.5 parts of 20% aqueous sodium hydroxide, and 20 parts of water. The resulting insoluble inorganic salts are removed by filtration and washed with dioxane. The filtrate is concentrated to dryness at reduced pressure and the residual solid is recrystallized from acetone. A solution of this material in acetone-ether is treated dropwise with isopropanolic hydrogen chloride, and the resulting solid is collected by filtration and dried to produce 17β-[N-methyl-N-(2-dimethylaminoethyl)amino]androst-5-en-3β-ol dihydrochloride, which is represented by the structural formula

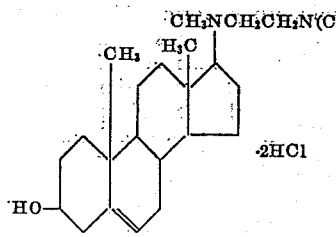

Example 39

To a solution of one part of 17β-[N-methyl-N-(3-dimethylaminopropyl)amino]androst-5-en-3β-ol in 8 parts of methanol and 28 parts of ether is added a solution of one part of methyl iodide in 7 parts of ether. The reaction mixture is stored at room temperature in a sealed container for about 2 hours. The resulting precipitate is collected by filtration to afford 17β-[N-methyl-N-(3-dimethylaminopropyl)amino]androst-5-en-3β-ol monomethiodide, M.P. about 221–225° (dec.). Recrystallization from methanol-isopropyl alcohol affords a pure sample, M.P. about 232–234° (dec.); [α]_D = −27° (methanol). It is represented by the structural formula

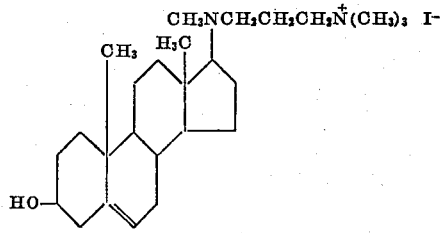

Example 40

The substitution of an equivalent quantity of 17β-[N-(3-morpholinopropyl)imino]androst-5-en-3β-ol 3-acetate in the process of Example 5 results in 17β-[N-(3-morpholinopropyl)amino]androst-5-en-3β-ol which is represented by the structural formula

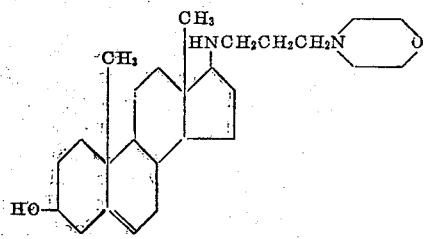

Example 41

By substituting an equivalent quantity of 17-[N-(3-morpholinopropyl)imino]androst-5-en-3β-ol 3-acetate and otherwise proceeding according to the method described in Example 14, 17β-[N-(3-morpholinopropyl)amino]-5α-androstan-3β-ol 3-acetate is obtained. This substance can be represented by the structural formula

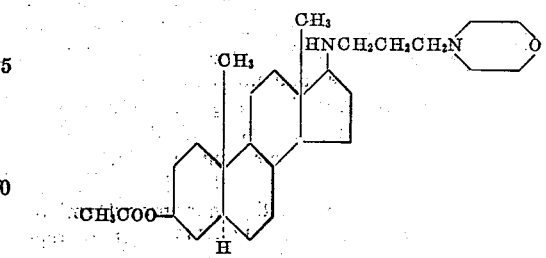

Example 42

An equivalent quantity of 3β-propionoxy-5α-androstan-17-one is substituted in the process described in Example 13 to produce 17-[N-(3-dimethylaminopropyl)imino]-5α-androstan-3β-ol 3-propionate.

Example 43

The substitution of an equivalent quantity of 17-[N-(3-dimethylaminopropyl)imino]-5α-androstan-3β-ol 3-propionate in the procedure of Example 14 affords 17β-[N-(3-dimethylaminopropyl)amino]-5α-androstan-3β-ol 3-propionate, which is represented by the structural formula

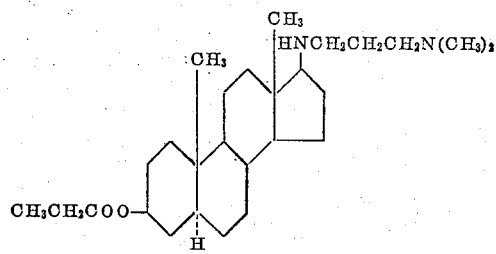

Example 44

A solution of 15 parts of 3α-hydroxy-5α-androstan-17-one and 220 parts of benzene is subjected to distillation to remove any moisture. To this anhydrous solution is added 9.4 parts of 3-dimethylaminopropylamine and 1.7 parts of p-toluenesulfonic acid, and the resulting reaction mixture is heated at reflux for about 5 hours, during which time the water of reaction is removed azeotropically. The solution is then cooled, washed with water, dried over anhydrous potassium carbonate, and concentrated to afford an oil, which solidifies on standing. Recrystallization from acetone-hexane yields 17-[N-(3-dimethylaminopropyl)imino]-5α-androstan-3α-ol, M.P. about 135–136°.

Example 45

To a mixture of 6.2 parts of lithium aluminum hydride and 155 parts of purified dioxane, under nitrogen, is added, with stirring over a period of about 1½ hours, a solution of 16 parts of 17-[N-(3-dimethylaminopropyl)-imino]-5α-androstan-3α-ol in 155 parts of dioxane. The stirred mixture is heated at reflux for about 4 hours, then is cooled and treated successively with a solution of 6.2 parts of water in 31 parts of dioxane, 5 parts of 20% aqueous sodium hydroxide, and 21 parts of water. The precipitated salts are removed by filtration and washed on the filter with dioxane. Removal of the solvent from the filtrate by distillation affords a residue, which is dissolved in anhydrous ether and treated with isopropanolic hydrogen chloride. The resulting precipitate is collected by filtration and recrystallized from aqueous isopropyl alcohol to produce 17β-(3-dimethylaminopropyl)amino-5α-androstan-3α-ol dihydrochloride.

Example 46

A solution of one part of 17β-(3-dimethylaminopropyl)amino-5α-androstan-3α-ol dihydrochloride in 50 parts of water is treated with a slight excess of 10% aqueous sodium carbonate, and this alkaline mixture is extracted with chloroform. The organic layer is separated, washed with water, dried over anhydrous sodium sulfate, and concentrated to dryness under reduced pressure. Recrystallization of the residue from aqueous acetone produces 17β-(3-dimethylaminopropyl)amino-5α-androstan-3α-ol, M.P. about 110–111°. It is represented by the structural formula

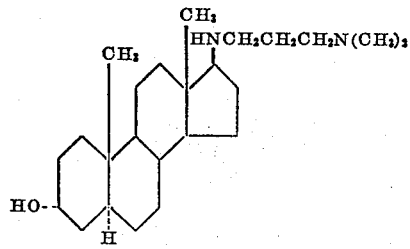

Example 47

To a mixture of 10 parts of 3α-hydroxy-5α-androstan-17-one and 30 parts of formic acid is added cautiously, 20 parts of 3-dimethylaminopropylamine, and the resulting mixture is heated at reflux for about 22 hours. This solution is cooled, then neutralized with a solution of 10 parts of sodium hydroxide in 250 parts of water. The resulting precipitate is collected by filtration, washed with water, and recrystallized from acetone to yield 17β-[N-(3-dimethylaminopropyl)formamido]-5α-androstan-3α-ol, M.P. about 138–139.5°.

Example 48

To a mixture of 5 parts of lithium aluminum hydride and 103 parts of purified dioxane, under nitrogen, is added dropwise over a period of about 1 hour, with stirring, a solution of 7 parts of 17β-[N-(3-dimethylaminopropyl)formamido]-5α-androstan-3α-ol in 77 parts of dioxane. This mixture is heated at reflux for about 20 hours, then is cooled and treated successively with a solution of 5 parts of water in 20 parts of dioxane, 4 parts of 20% aqueous sodium hydroxide, and 19 parts of water. The precipitate which results is removed by filtration and washed on the filter with dioxane. The filtrate is concentrated to dryness to yield a white solid, which is recrystallized from acetone, resulting in 17β-[N-methyl-N-(3-dimethylaminopropyl)amino]-5α-androstan-3α-ol, M.P. about 133–134°. It is represented by the structural formula

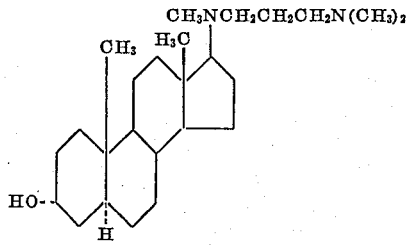

Example 49

A solution of 2.2 parts of 17β-[N-methyl-N-(3-dimethylaminopropyl)amino]-5α-androstan-3α-ol in 24 parts of acetone and 21 parts of ether is treated with a slight excess of isopropanolic hydrogen chloride. The resulting precipitate is collected by filtration to afford 17β-[N-methyl-N-(3-dimethylaminopropyl)amino]-5α-androstan-3α-ol dihydrochloride.

Example 50

To a solution of 15 parts of 3β-hydroxyandrost-5-en-17-one in 36.6 parts of formic acid is added, with stirring over a period of about 10 minutes, 30 parts of 3-methylaminopropylamine. This reaction mixture is heated at reflux for about 24 hours, then is cooled and poured cautiously into a solution of 20 parts of sodium hydroxide in 500 parts of water. The precipitate which forms is collected by filtration, then is extracted with chloroform. The chloroform solution is washed with water, dried over a mixture of anhydrous potassium carbonate and decolorizing carbon, and concentrated to afford an oily residue, which is dissolved in acetone and treated with isopropanolic hydrogen chloride to afford crude 17β-[N-(3-methylaminopropyl)formamido]androst-5-en-3β-ol hydrochloride. This crude salt is dissolved in water, and the aqueous solution is made alkaline by the addition of dilute aqueous sodium carbonate. The resulting precipitate is separated by centrifugation, then is washed with water and is extracted with chloroform containing a small proportion of methanol. This organic extract is dried over potassium carbonate, and the solvent is removed by distillation to afford an oil. This oil is dissolved in acetone and treated with isopropanolic hydrogen chloride to yield pure 17β-[N-(3-methylaminopropyl)formamido]androsat-5-en-3β-ol hydrochloride.

Example 51

To a mixture of 5.8 parts of lithium aluminum hydride and 155 parts of dioxane, under nitrogen, is added with stirring over a period of about 30 minutes, a solution of 11 parts of 17β-[N-(3-methylaminopropyl)formamido]androst-5-en-3β-ol in 103 parts of dioxane. This mixture is heated at reflux for about 18 hours, then is cooled and treated successively with a solution of 5.8 parts of water in 20 parts of dioxane, 5 parts of 20% aqueous sodium hydroxide, and 20 parts of water. The precipitated salts are removed by filtration and washed with dioxane. Distillation of the solvent from the filtrate yields an oil, which is crystallized from acetone to afford 17β-[N-methyl-N-(3-methylaminopropyl)amino]androst-5-en-3β-oil, M.P. about 121–125°. This compound is represented by the structural formula

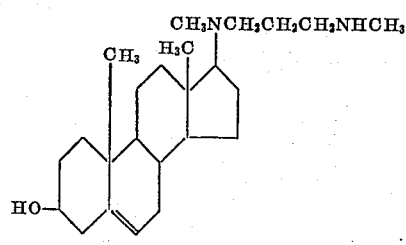

Example 52

The reaction of one part of 17β-[N-methyl-N-(3-methylaminopropyl)amino]androst-5-en-3β-ol with isopropanolic hydrogen chloride according to the procedure of Example 49 results in 17β-[N-methyl-N-(3-methylaminopropyl)amino]androst-5-en-3β-ol dihydrochloride.

Example 53

The substitution of 11.5 parts of 17β-[N-(3-dimethylaminopropyl)formamido]-5α-androstan-3β-ol in the procedure of Example 51 affords 17β-[N-methyl-N-(3-dimethylaminopropyl)amino] - 5α - androstan-3β-ol, M.P. about 134.5–135.5°. It can be represented by the structural formula

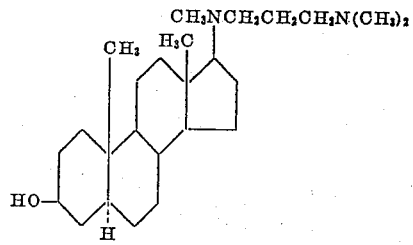

Example 54

The substitution of one part of 17β-[N-methyl-N-(3-dimethylaminopropyl)amino]-5α-androstan-3β-ol in the procedure of Example 49 results in 17β-[N-methyl-N-(3-dimethylaminopropyl)amino] - 5α - androstan-3β-ol dihydrochloride.

Example 55

A mixture of 50 parts of 3β-hydroxyandrost-5-en-17-one, 50 parts of N-methylformamide and 61 parts of formic acid is heated at reflux for about 20 hours, then is cooled and poured into 2500 parts of water containing 50 parts of sodium hydroxide. The resulting precipitate is collected by filtration, dried on the filter, then extracted with chloroform. The organic extract is washed with water, dried over anhydrous potassium carbonate containing decolorizing carbon, then evaporated to dryness to afford a white solid residue.

A mixture of 51 parts of the latter residue with 360 parts of methanol, 178.5 parts of concentrated hydrochloric acid, and 150 parts of water is heated at reflux on the steam bath for about 3½ hours, then is concentrated to dryness in vacuo. The resulting solid is dissolved in hot water, and this aqueous solution is poured into a solution of 50 parts of sodium hydroxide in 2,000 parts of water. The precipitate which forms is collected by filtration, washed with water, dried on the filter, then recrystallized from acetone to yield 17β-(N-methylamino)androst-5-en-3β-ol, M.P. about 189–194°.

Example 56

The substitution of 50 parts of 3β-hydroxy-5α-androstan-17-one in the procedure of Example 55 results in 17β-(N-methylamino)-5α-androstan-3β-ol, M.P. about 211–212°.

Example 57

To 20.3 parts of acrylonitrile is added portionwise, over a period of about 30 minutes, 7 parts of 17β-(N-methylamino)androst-5-en-3β-ol. To this mixture is added 0.2 part of trimethyl benzyl ammonium hydroxide, and this reaction mixture is heated on the steam bath for about 16 hours. The excess acrylonitrile is distilled in vacuo to afford a semi-solid residue containing 17β-[N-methyl-N-(2-cyanoethyl)amino]androst-5-en-3β-ol.

The latter residue is dissolved in 75 parts of purified dioxane, and the resulting solution is added dropwise over a period of about one hour, with stirring, to a mixture of 4 parts of lithium aluminum hydride with 100 parts of purified dioxane. This reaction mixture is heated at reflux for about 18 hours, then is treated successively with 4 parts of water in 30 parts of dioxane, 3 parts of 20% aqueous sodium hydroxide, and 13.6 parts of water. The precipitated salts are removed by filtration and washed on the filter with dioxane. The filtrate is stripped of solvent to afford a residue, which is recrystallized from acetone to produce 17β-[N-methyl-N-(3-aminopropyl)amino]androst-5-en-3β-ol of the structural formula

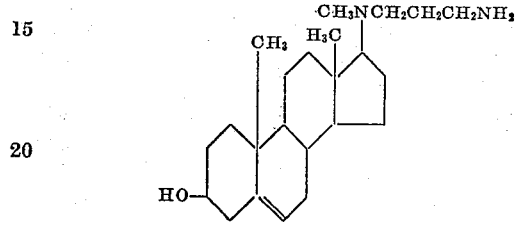

Example 58

By substituting 7 parts of 17β-(N-methylamino)-5α-androstan-3β-ol and otherwise proceeding according to the processes of Example 57, 17β-[N-methyl-N-(3-aminopropyl)amino]-5α-androstan-3β-ol is obtained. It can be represented by the structural formula

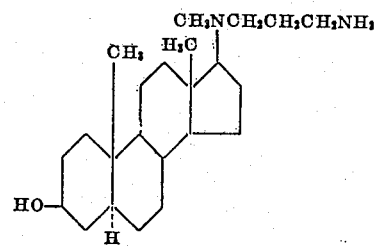

Example 59

A mixture of 4 parts of 17β-(3-dimethylaminopropyl)aminoandrost-5-en-3β-ol, 21.6 parts of acetic anhydride, and 40 parts of pyridine is stored at room temperature for about 18 hours, then is poured into 350 parts of water containing 20 parts of sodium acetate. This aqueous mixture is made alkaline by the addition of concentrated aqueous sodium carbonate, and the resulting precipitate is collected by filtration to afford 17β-[N-(3-dimethylaminopropyl)acetamido]androst - 5-en-3β - ol 3-acetate.

Treatment of a solution of the latter amine in ether with isopropanolic hydrogen chloride followed by recrystallization of the resulting solid from acetone results in 17β-[N-(3-dimethylaminopropyl)acetamido]androst-5-en-3β-ol 3-acetate hydrochloride.

Example 60

To a mixture of 1.6 parts of lithium aluminum hydride in 40 parts of dioxane is added over a period of about 1½ hours, with stirring, a solution of 3.2 parts of 17β-[N-(3-dimethylaminopropyl)acetamido]androst-5-en - 3β - ol 3-acetate in 40 parts of dioxane. The reaction mixture is heated at reflux for about 18 hours, then is treated successively with 1.6 parts of water in 15 parts of dioxane, 1.3 parts of 20% aqueous sodium hydroxide, and 6 parts of water. The precipitated salts are removed by filtration and washed with dioxane. Distillation of the solvent from the filtrate affords an oil, which solidifies on standing. Recrystallization from acetone yields 17β-[N-ethyl-N-(3-dimethylaminopropyl)]androst-5-en - 3β - ol, M.P. about 97–100°. It is represented by the structural formula

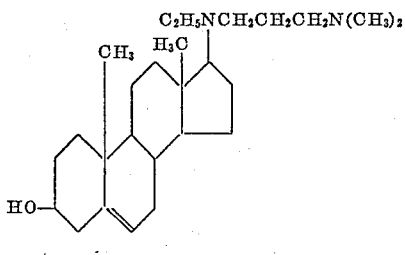

Example 61

A solution of 1 part of 17β-[N-ethyl-N-(3-dimethylaminopropyl)amino]androst-5-en-3β-ol in 20 parts of acetone is treated with isopropanolic hydrogen chloride to afford the corresponding dihydrochloride.

Example 62

By substituting 30 parts of 2-ethylaminoethylamine and otherwise proceeding according to the processes of Example 50, 17β-[N-(2-ethylaminoethyl)formamido]androst-5-en-3β-ol hydrochloride is obtained.

Example 63

The substitution of 11 parts of 17β-[N-(2-ethylaminoethyl)formamido]androst-5-en-3β-ol in the procedure of Example 51 results in 17β-[N-methyl-N-(2-ethylaminoethyl)amino]androst-5-en-3β-ol of the structural formula

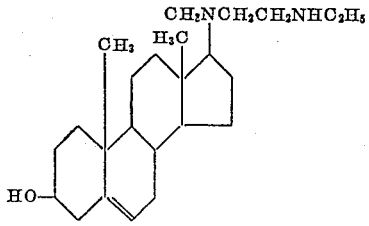

Example 64

By substituting 25.7 parts of crotononitrile and otherwise proceeding according to the processes of Example 57, 17β-[N-methyl-N-(3-amino-1-methylpropyl)amino]androst-5-en-3β-ol is obtained. It is represented by the structural formula

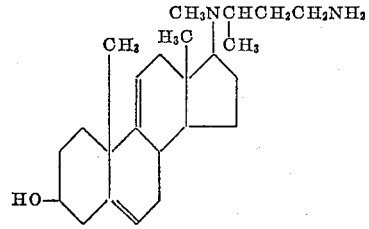

Example 65

The substitution of 27.3 parts of propionic anhydride in the procedure of Example 59 results in 17β-[N-(3-dimethylaminopropyl)propionamido]androst-5-en-3β-ol 3-propionate.

Example 66

By substituting 3.4 parts of 17β-[N-(3-dimethylaminopropyl)propionamido]androst-5-en-3β-ol 3-propionate and otherwise proceeding according to the processes of Example 60, 17β-[N-n-propyl-N-(3-dimethylaminopropyl)amino]androst-5-en-3β-ol is obtained. It can be represented by the structural formula

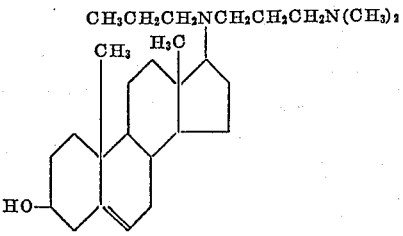

Example 67

The reaction of 10 parts of 3β-hydroxyandrost-5-en-17-one, 20 parts of 4-dimethylaminobutylamine, and 24.4 parts of formic acid according to the procedure of Example 2, followed by recrystallization of the crude product from methanol-acetone, results in 17β-[N-(4-dimethylaminobutyl)formamido]androst-5-en-3β-ol, M.P. about 184–187°; [α]_D=—57° (methanol).

Example 68

A solution of 7 parts of 17β-[N-(4-dimethylaminobutyl)formamido]androst-5-en-3β-ol in 220 parts of dioxane is allowed to react with a slurry of 1.7 parts of lithium aluminum hydride in 100 parts of dioxane according to the procedure of Example 48. The resulting product is recrystallized from acetone to yield 17β-[N-methyl-N-(4-dimethylaminobutyl)amino]androst-5-en-3β-ol, M.P. about 107–110°; [α]_D=—56.5° (chloroform). It can be represented by the structural formula

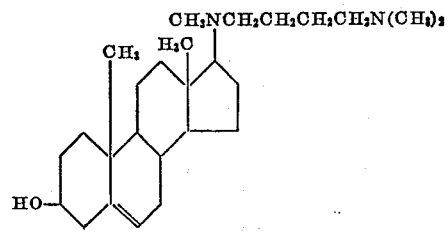

Example 69

The substitution of 2.2 parts of 17β-[N-methyl-N-(4-dimethylaminobutyl)amino]androst-5-en-3β-ol in the procedure of Example 49 affords a product which is recrystallized from aqueous ethanol-butanone to afford pure 17β-[N-methyl-N-(4-dimethylaminobutyl)amino]androst-5-en-3β-ol dihydrochloride.

Example 70

To a solution of 15.2 parts of 17β-(N-methylamino)androst-5-en-3β-ol in 250 parts of benzene containing 7.3 parts of triethylamine is added dropwise a solution of 16.9 parts of 2-chloropropionyl chloride in 50 parts of benzene. This reaction mixture is heated at reflux with stirring for about one hour, then is cooled and filtered. The filter cake is washed on the filter with benzene, and the washings are combined with the filtrate. The benzene solution is then washed successively with dilute hydrochloric acid, aqueous sodium bicarbonate, and water, and is dried over anhydrous sodium sulfate. Concentration to dryness of this solution affords 17β-[N-methyl-N-(2-chloropropionyl)amino]androst-5-en-3β-ol 3-(2-chloropropionate).

To a solution of 48.4 parts of 17β-[N-methyl-N-(2-chloropropionyl)amino]androst-5-en-3β-ol 3-(2-chloropropionate) in 300 parts of dioxane is added a solution of 6 parts of potassium hydroxide in 2 parts of water. This reaction mixture is kept at room temperature for about 18 hours, then is diluted with water and extracted with ether. The ether extract is washed with water, dried over anhydrous sodium sulfate, and evaporated to dryness, resulting in 17β-[N-methyl-N-(2-chloropropionyl)amino]androst-5-en-3β-ol.

Example 71

To a solution of 7.8 parts of 17β-[N-methyl-N-(2-chloropropionyl)amino]androst-5-en-3β-ol in 100 parts of toluene containing 23 parts of butanone is added a solution of 6.2 parts of methylamine in 25 parts of toluene. This reaction mixture is heated in a sealed container for about 40 hours, then is cooled, washed with water, dried over anhydrous sodium sulfate, and concentrated to dryness at reduced pressure to yield 17β-[N-methyl-N-(2-methylaminopropionyl)amino]androst-5-en-3β-ol.

Example 72

To a slurry of 3.8 parts of lithium aluminum hydride in 75 parts of purified dioxane is added, with stirring a solution of 7.69 parts of 17β-[N-methyl-N-(2-methylaminopropionyl)amino]androst-5-en-3β-ol in 100 parts of purified dioxane. This reaction mixture is heated at reflux with stirring for about 18 hours, then is cooled in an ice bath and treated successively with 50 parts of dioxane containing 4 parts of water, 3 parts of 20% sodium hydroxide and 14 parts of water. The precipitated salts are removed by filtration and washed on the filter with dioxane. The filtrate is concentrated to dryness to yield 17β-[N-methyl-N-(3-methylaminopropyl)amino]androst-5-en-3β-ol.

Example 73

The substitution of 9 parts of ethylamine in the procedure of Example 71 results in 17β-[N-methyl-N-(2-ethylaminopropionyl)amino]androst-5-en-3β-ol.

Example 74

By substituting 7.97 parts of 17β-[N-methyl-N-(2-ethylaminopropionyl)amino]androst - 5 - en - 3β - ol and otherwise proceeding according to the procedure of Example 72, 17β1[N-methyl-N-(3-ethylaminopropyl)amino]androst-5-en-3β-ol is obtained.

Example 75

The substitution of an equivalent quantity of 17β-[N-(3 - pyrrolidinopropyl)formamido]androst - 5 - en - 3β - ol in the procedure of Example 4 results in 17β-[N-methyl - N - (3 - pyrrolidinopropyl)amino]androst - 5 - en - 3β-ol, M.P. about 158–160°. It is represented by the structural formula

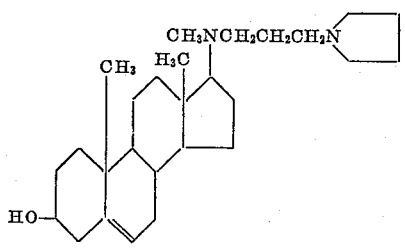

What is claimed is:
1. A compound of the structural formula

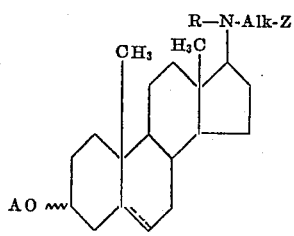

wherein A is selected from the group consisting of hydrogen and lower alkanoyl radicals, R is selected from the group consisting of hydrogen and lower alkyl radicals, Alk is a lower alkylene radical containing more than one carbon atom and separating the —NR and Z functions by at least 2 carbon atoms, the dotted line indicates the optional presence of a doubly-bonded linkage between carbon atoms 5 and 6, and Z is selected from the group consisting of

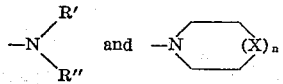

radicals, wherein R' and R" are selected from the group consisting of hydrogen and lower alkyl radicals, X is selected from the group consisting of methylene, epoxy, and methylimino radicals, and n is selected from the group consisting of 0 and 1.

2. A compound of the structural formula

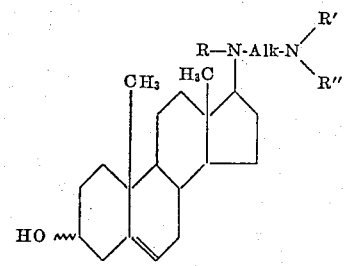

wherein Alk is a lower alkylene radical and R, R', and R" are lower alkyl radicals.

3. A compound of the structural formula

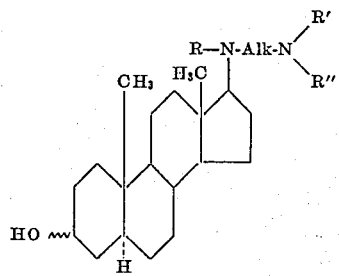

wherein Alk is a lower alkylene radical and R, R', and R" are lower alkyl radicals.

4. A compound of the structure formula

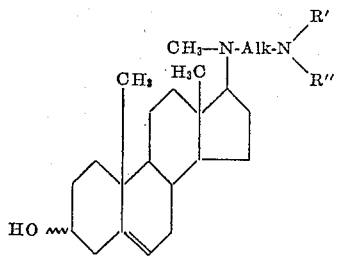

wherein Alk is a lower alkylene radical and R' and R" are lower alkyl radicals.

5. A compound of the structural formula

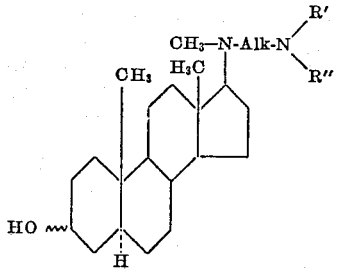

wherein Alk is a lower alkylene radical and R' and R" are lower alkyl radicals.

6. 17β-[N-methyl - N - (3-dimethylaminopropyl)amino]androst-5-en-3β-ol.

7. 17β-[N-methyl - N - (2-dimethylaminoethyl)amino]androst-5-en-3β-ol.

8. 17β-[N-methyl - N - (3-piperidinopropyl)amino]androst-5-en-3β-ol.

9. 17β-[N-methyl - N - (3-dimethylaminopropyl)amino]-5α-androstan-3α-ol.

10. 17β-[N-methyl - N - (3-dimethylaminopropyl)amino]-5α-androstan-3β-ol.

No references cited.